United States Patent
Schnapp et al.

(10) Patent No.: US 9,015,391 B2
(45) Date of Patent: Apr. 21, 2015

(54) DISPATCHING OF SERVICE REQUESTS IN REDUNDANT STORAGE VIRTUALIZATION SUBSYSTEMS

(75) Inventors: Michael Gordon Schnapp, Taipei Hsien (TW); Chih-Chung Chan, Taipei Hsien (TW)

(73) Assignee: Infortrend Technology, Inc., Zhonghe District, New Taipei (TW)

( * ) Notice: Subject to any disclaimer, the term of this patent is extended or adjusted under 35 U.S.C. 154(b) by 807 days.

(21) Appl. No.: 10/907,312

(22) Filed: Mar. 29, 2005

(65) Prior Publication Data

US 2005/0240805 A1 Oct. 27, 2005

Related U.S. Application Data

(60) Provisional application No. 60/521,308, filed on Mar. 30, 2004.

(51) Int. Cl.
  *G06F 13/12* (2006.01)
  *G06F 3/06* (2006.01)
  *G06F 11/20* (2006.01)

(52) U.S. Cl.
  CPC ............ *G06F 3/0611* (2013.01); *G06F 3/0635* (2013.01); *G06F 3/0683* (2013.01); *G06F 11/2089* (2013.01)

(58) Field of Classification Search
  USPC .......................................................... 710/74
  See application file for complete search history.

(56) References Cited

U.S. PATENT DOCUMENTS

| | | | |
|---|---|---|---|
| 5,987,549 A * | 11/1999 | Hagersten et al. ............. | 710/107 |
| 6,064,666 A * | 5/2000 | Willner et al. ................. | 370/352 |
| 6,775,288 B1 * | 8/2004 | Tooker et al. .............. | 370/395.2 |
| 7,046,680 B1 * | 5/2006 | McDysan et al. ............. | 370/396 |
| 7,085,883 B1 * | 8/2006 | Dalgic et al. .................... | 711/114 |
| 2002/0103889 A1 * | 8/2002 | Markson et al. ............... | 709/223 |
| 2002/0161885 A1 * | 10/2002 | Childers et al. ............... | 709/224 |
| 2003/0149848 A1 * | 8/2003 | Ibrahim et al. ................ | 711/154 |
| 2003/0196002 A1 * | 10/2003 | Nakayama et al. ............... | 710/1 |
| 2004/0034751 A1 * | 2/2004 | Horn et al. ..................... | 711/158 |
| 2004/0153844 A1 * | 8/2004 | Ghose et al. .................... | 714/42 |
| 2004/0186930 A1 * | 9/2004 | Gadkari et al. ................. | 710/22 |
| 2004/0215713 A1 * | 10/2004 | Bish et al. ..................... | 709/203 |
| 2006/0155883 A1 * | 7/2006 | Chou et al. ........................ | 710/3 |

* cited by examiner

*Primary Examiner* — Henry Tsai
*Assistant Examiner* — John Roche
(74) *Attorney, Agent, or Firm* — Winston Hsu; Scott Margo (57) ABSTRACT

A method for dispatching of service requests in a redundant storage virtualization subsystem including a plurality of storage virtualization controllers is disclosed. The method comprises the steps of the host entity issuing a first service request to a first one of the SVCs; the first SVC handling the first service request, acquiring a first result of servicing the first service request, and returning the first result to the host entity the result; and, the host entity issuing a second service request to a second one of the SVCs; and, the second SVC handling the second service request, acquiring a second result of servicing the second service request, and returning the second result to the host entity the result. A storage virtualization subsystem implementing the method, a computer system comprising such storage virtualization subsystem, and a storage media having machine-executable codes stored therein for performing the method are also disclosed.

31 Claims, 9 Drawing Sheets

DISPATCHING OF SERVICE REQUESTS IN REDUNDANT STORAGE VIRTUALIZATION SUBSYSTEMS

RELATED APPLICATION

This application claims priority application Ser. No. 60/521,308, filed on Mar. 30, 2004, and entitled "DISPATCHING OF SERVICE REQUESTS IN REDUNDANT STORAGE VIRTUALIZATION SUBSYSTEMS," which application is incorporated herein by reference.

BACKGROUND OF INVENTION

1. Field of the Invention

The present invention is related to a method for dispatching of service requests in redundant storage virtualization subsystems.

2. Description of the Prior Art

One important feature that characterizes Storage Virtualization Subsystems (SVSs) is the ability to configure, manage and/or monitor the subsystem by a host entity. To accomplish this, the Storage Virtualization Controller(s) (SVC(s)) in the system implement protocols that communicate configuration, management and monitoring information between at least one SVC in the SVS and the host entity. These protocols typically support such communication to take place over multiple types of physical media, such as RS-232, LAN, host-side IO device interconnect, etc. In the case of a SVS that consists of redundantly configured SVCs, such exchanges can traditionally only take place between one of the SVCs in the redundant combination, typically referred to as the Primary SVC, and the host entity, for only the Primary SVC is equipped to receive, dispatch and/or execute configuration, management and monitoring requests (hereafter referred to as Service requests). This is an important architectural characteristic that is adopted in an effort to avoid possible conflicts that may arise if two or more SVCs in the redundant combination attempt to concurrently Service such requests.

As mentioned above, the SVC(s) in a SVS typically implement protocols that communicate configuration, management and monitoring information (hereafter referred to as Service information) between one of the SVCs in the SVS and the host entity. If the SVS consists of a set of redundantly configured SVCs, then, traditionally, such exchanges are conducted entirely between the Primary SVC in the redundant combination and the host entity. The other SVC(s) in the redundant combination, referred to hereafter as Secondary SVCs, are not directly involved with the exchanges and the servicing of Service requests that are conveyed. While this kind of a limitation, when the host entity can always access any SVC in the redundant combination, does not necessarily introduce additional operational limitations, there may be configurations in which the connection from the host entity to one or more of the SVCs in the redundant combination does not exist or situations in which breaks or malfunctions in connections cause the host entity to lose the ability to communicate with one or more SVCs in the redundant combination. This, in turn, gives rise to the possibility that the host entity may not have to begin with (due to configurational peculiarities) or have and then lose (due to connection break or malfunction) the ability to convey Service requests to the SVS. In certain applications in which the processing of Service requests is critical to the proper functionality of the system, such lack or loss of ability to convey Service requests could well be unacceptable.

Accordingly, there is a need for a method to solve the above-mentioned problems of the existing technologies.

SUMMARY OF INVENTION

The current invention endeavors to eliminate the limitation that Service information can only be conveyed between the host entity and the Primary SVC in a redundant SVC combination. This is done by creating mechanisms by which conflicts that might result by having Service requests serviced concurrently on multiple SVCs can be avoided while supporting the conveyance of Service information between the host entity and multiple SVCs in the redundant combination.

An objective of the present invention is to provide a mechanism by which Service requests issued by a host entity can be received and dispatched by more than one of a set of SVCs in a redundant SVS.

An further objective of the present invention is to provide a method for dispatching Service requests in a redundant SVS.

A still further objective of the present invention is to provide a data storage subsystem and a data storage system incorporated with the above-mentioned Service request dispatching method.

According to an embodiment of the invention, a method for dispatching Service requests in a redundant SVS including a plurality of SVCs is provided. The method comprises the steps of: said host entity issuing a first service request to a first one of said SVCs; said first SVC handling said first service request, acquiring a first result of servicing the first service request, and returning said first result to the host entity the result; and, said host entity issuing a second service request to a second one of said SVCs; and, said second SVC handling said second service request, acquiring a second result of servicing the second service request, and returning said second result to the host entity the result.

According to another embodiment of the invention, a method for dispatching Service requests in a redundant SVS including a plurality of SVCs is provided. The method comprises the steps of: selecting at least one of the SVCs; enabling a port on the at least one selected SVC for dispatching of service requests; issuing at least one service request to said at least one selected SVC; said at least one service request being handled by said at least one selected SVC; acquiring a result of servicing the at least one service request by said at least one selected SVC; and, returning to the host entity the result by said at least one selected SVC.

According to a further embodiment of the invention, a method for dispatching Service requests in a redundant SVS including a plurality of SVCs is provided. The method comprises the steps of: said host entity selecting a first one of the SVCs to issue service requests; said first SVC receiving said service requests; said first SVC completing the servicing of all the received service requests; and, said host entity selecting a second one of the SVCs to issue service requests.

According to still a further embodiment of the invention, a method for dispatching Service requests in a redundant SVS including a plurality of SVCs is provided. The method comprises the steps of: a first one of the SVCs receiving a service request from the host entity and forwarding said received service request to a second one of the SVCs; said second SVC dispatching the service request for servicing; on completion of request servicing, said second SVC conveying response data and status information to said first SVC; and, said first SVC forwarding said response data and status information to the host entity.

According to still a further embodiment of the invention, a method for dispatching Service requests in a redundant SVS including a plurality of SVCs is provided. The method comprises the steps of: a first one of the SVCs receiving a service request from the host entity; determining whether or not said first SVC is a service request servicing function owner; if said first SVC is the service request servicing function owner, servicing the service requests directly, otherwise issuing a request to a service request servicing function ownership arbiter for an ownership transfer to itself; said ownership arbiter issuing a request to the servicing function owner to relinquish ownership; said servicing function owner preparing to relinquish ownership first and then issuing an acknowledgement to said ownership arbiter acknowledging the relinquishing of ownership; said ownership arbiter issuing an acknowledgement to a said SVC to which ownership is to be transferred and the said SVC becoming a new servicing function owner; said new servicing function owner starting to service pending service requests; and, on completion of request servicing, said new servicing function owner conveying response data and status information to the host entity.

According to still a further embodiment of the invention, a method for dispatching Service requests in a redundant SVS including a plurality of SVCs is provided. The method comprises the steps of: a first one of the SVCs receiving a service request from the host entity; determining whether or not said first SVC is a service request servicing function owner; if said first SVC is the service request servicing function owner, servicing the service requests directly, otherwise issuing a request to said servicing function owner for an ownership transfer to itself; said servicing function owner determining an appropriate time to start the process of relinquishing ownership and preparing the relinquishing of ownership; said servicing function owner issuing an acknowledgement to a said SVC to which ownership is to be transferred and the said SVC becoming a new servicing function owner; said new servicing function owner starting to servicing pending service requests; and, on completion of request servicing, said new servicing function owner conveying response data and status information to the host entity.

According to still a further embodiment of the invention, a storage virtualization computer system is provided. The system comprises a host entity for issuing service requests; a plurality of storage virtualization controllers (SVCs) coupled to said host entity; and, a plurality of physical storage devices, each coupled to said SVCs and accessed by said SVCs, for providing storage to said storage virtualization computer system; wherein said host entity can discover at least two SVCs and convey service request through interconnects to said at least two SVCs, and only one of said at least two SVCs can service the service requests at a time.

According to still a further embodiment of the invention, a storage virtualization subsystem is provided. The subsystem comprises a plurality of SVCs coupled to a host entity; and, a plurality of physical storage devices, each coupled to said SVCs and accessed by said SVCs, for providing storage to said host entity; wherein said host entity can discover said SVCs and convey service request through the connections to said SVCs, and only one of said SVCs can service the service requests at a time.

According to a further embodiment of the invention, a method for dispatching of service requests in a redundant storage virtualization computer system is provided. The method comprises the steps of: a host entity selecting only one of a plurality of SVCs redundantly configured to issue service requests at a time; and said selected SVC receiving service requests from said host entity and servicing them, then returning the results of the servicing of the service requests to said host entity.

According to a further embodiment of the invention, a method for dispatching of service requests in a redundant storage virtualization computer system is provided. The method comprises the steps of: generating a service request; checking if all issued service requests have been serviced to completion; issuing said service request to one of redundant SVCs, if all issued service requests have been serviced to completion; otherwise, said host entity issuing said service request to one of said SVCs after said issued service requests have been serviced to completion.

According to a further embodiment of the invention, a method for dispatching of service requests performed by a host in a redundant storage virtualization computer system having a plurality of SVCs redundantly configured is provided. The method comprises the steps of: generating a new service request; checking if all previously issued service requests have been serviced to completion; issuing said new service request to one of the SVCs, if all the previously issued service requests have been serviced to completion; otherwise, said host entity issuing said new service request to the SVC which received said service requests issued previously and not serviced to completion.

According to still a further embodiment of the invention, a method for dispatching Service requests in a redundant storage virtualization computer system having a plurality of SVCs redundantly configured is provided. The method comprises the steps of: a host entity selecting one of redundant SVCs to issue service requests; said selected SVC receiving service requests from said host entity and checking if it is an owner of service request servicing function; and, if it is, then said selected SVC servicing the request; and, if it is not, said selected SVC forwarding service requests to an owner of service request servicing function, then said owner receiving and dispatching the service requests for servicing and returning the results of the servicing of the service requests to said host entity.

According to a further embodiment of the invention, a method for dispatching of service requests performed by a first SVC in a redundant storage virtualization computer system having a plurality of SVCs redundantly configured is provided. The method comprises the steps of: receiving a service request from a host entity; forwarding said service request to a second SVC; receiving response data and status information of servicing said service request from the second SVC; and, forwarding said data and information to said host entity.

According to a further embodiment of the invention, a method for dispatching of service requests performed by a first SVC in a redundant storage virtualization computer system having a plurality of SVCs redundantly configured is provided. The method comprises the steps of: receiving a service request from a second SVC; servicing said service request; and, issuing response data and status information of servicing said service request to the second SVC.

According to a further embodiment of the invention, a method for dispatching of service requests performed by a SVC in a redundant storage virtualization computer system having a plurality of SVCs redundantly configured is provided. The method comprises the steps of: receiving a service request from a host entity; determining whether or not said SVC is a service request servicing function owner; if said SVC is the service request servicing function owner, servicing the service requests directly; and, if said SVC is not the owner, said SVC issuing a request to a service request servicing function ownership arbiter for an ownership transfer to itself, and said SVC servicing the service requests after receiving an acknowledgement from said ownership arbiter.

According to a further embodiment of the invention, a method for arbitrating of service request servicing function ownership performed by a first SVC in a redundant storage virtualization computer system having a plurality of SVCs redundantly configured is provided. The method comprises the steps of: receiving a request from a second SVC for an ownership transfer; issuing a request to a service request servicing function owner to relinquish ownership; receiving an acknowledgement from said owner that ownership has been relinquished; and, issuing an acknowledgement to a said SVC to which ownership is to be transferred.

According to a further embodiment of the invention, a method for relinquishing of service request servicing function ownership performed by a first SVC in a redundant storage virtualization computer system having a plurality of SVCs redundantly configured is provided. The method comprises the steps of: receiving a request for it to relinquish ownership; preparing to relinquish ownership at a convenient time; and, issuing an acknowledgement to a second SVC issuing said request to inform it that ownership has been relinquished.

These and various other features and advantages which characterize the present invention will be described in the detailed description.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION

Brief Introduction to Storage Virtualization

Storage virtualization is a technology that has been used to virtualize physical storage by combining sections of physical storage devices (PSDs) into logical storage entities, herein referred to as logical media units (LMUs), that are made accessible to a host system. This technology has been used primarily in redundant arrays of independent disks (RAID) storage virtualization, which combines smaller physical storage devices into larger, fault tolerant, higher performance logical media units via RAID technology.

A Storage virtualization Controller, abbreviated SVC, is a device the primary purpose of which is to map combinations of sections of physical storage media to logical media units visible to a host system. IO requests received from the host system are parsed and interpreted and associated operations and data are translated into physical storage device IO requests. This process may be indirect with operations cached, delayed (e.g., write-back), anticipated (read-ahead), grouped, etc., to improve performance and other operational characteristics so that a host IO request may not necessarily result directly in physical storage device IO requests in a one-to-one fashion.

An External (sometimes referred to as "Stand-alone") Storage Virtualization Controller is a Storage Virtualization Controller that connects to the host system via an IO interface and that is capable of supporting connection to devices that reside external to the host system and, in general, operates independently of the host.

One example of an external Storage Virtualization Controller is an external, or stand-alone, direct-access RAID controller. A RAID controller combines sections on one or multiple physical direct access storage devices (DASDs), the combination of which is determined by the nature of a particular RAID level, to form logical media units that are contiguously addressable by a host system to which the logical media unit is made available. A single RAID controller will typically support multiple RAID levels so that different logical media units may consist of sections of DASDs combined in different ways by virtue of the different RAID levels that characterize the different units.

Another example of an external Storage Virtualization Controller is a JBOD emulation controller. A JBOD, short for "Just a Bunch of Drives", is a set of physical DASDs that connect directly to a host system via one or more a multiple-device IO device interconnect channels. DASDs that implement point-to-point IO device interconnects to connect to the host system (e.g., Parallel ATA HDDs, Serial ATA HDDs, etc.) cannot be directly combined to form a "JBOD" system as defined above for they do not allow the connection of multiple devices directly to the IO device channel. An intelligent "JBOD emulation" device can be used to emulate multiple multiple-device IO device interconnect DASDs by mapping IO requests to physical DASDs that connect to the JBOD emulation device individually via the point-to-point IO-device interconnection channels.

Another example of an external Storage Virtualization Controller is a controller for an external tape backup subsystem.

Storage virtualization subsystem may provide storage virtualization to hosts connected via standard host-storage interfaces using a plurality of Storage Virtualization controllers configured redundantly so that should one controller fail or malfunction, another controller will takeover all the operations originally performed by the failed or malfunctioned controller.

Please also refer to the U.S. Provisional Application "DISPATCHING OF SERVICE REQUESTS IN REDUNDANT STORAGE VIRTUALIZATION SUBSYSTEMS", Ser. No. 60/521,308, filed on Mar. 30, 2004, which is the priority basis application of the present application. The operation flows and structure pertaining to a SVC, a SVS and a redundant storage virtualization subsystem are explained in detail in the Attachment entitled "Redundant Serial ATA External Storage Virtualization Subsystem" of the U.S. Provisional Application.

Embodiments of the Present Invention

Figure 1:
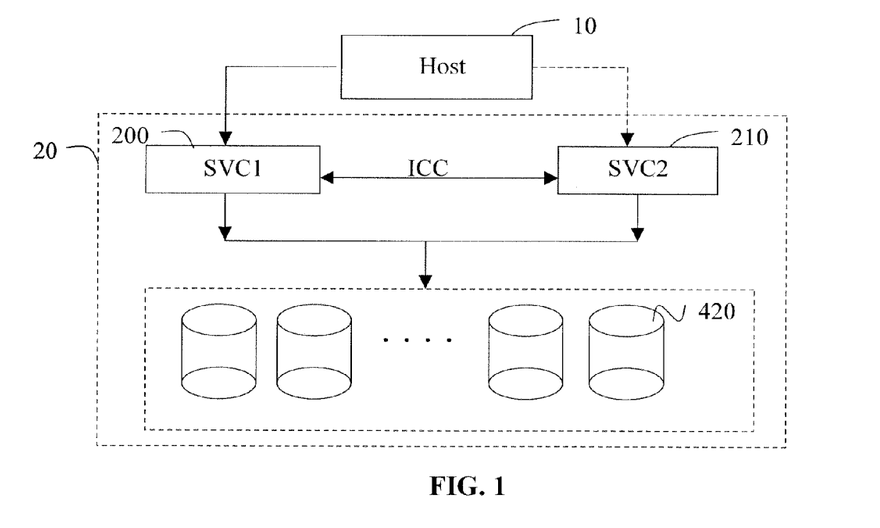
FIG. 1 is a functional diagram illustrating an embodiment of the redundant storage virtualization system according to the present invention.

Please refer to FIG. 1, in which an embodiment diagram of the redundant storage virtualization system according to the present invention is illustrated. The system contains a host entity 10 and a redundant storage virtualization subsystem (SVS) 20. The SVS 20 contains a redundant storage virtualization controller pair (including SVC1 200 and SVC2 200) and a plurality of PSDs 420. Both SVCs 200 are connected to the PSDs 420 to provide data storage space to the system. The storage virtualization controller 200 can be a RAID controller or a JBOD emulator.

Although two SVCs are illustrated in FIG. 1, it should be noted that there can be more than two SVCs, depending on the requirements of the system. Although there is illustrated in FIG. 1 only one host entity 10 connected with one SVS 20, there can be more than one host entity 10 attached to the SVS 20. The host entity 10 can be a host computer, such as a server system, a workstation, a PC system, or the like. Alternatively, the host entity 10 can be another SVC.

The first embodiment of the current invention consists of supporting the conveyance of Service information between host entities and any SVC in the redundant SVC combination. This would typically be accomplished by implementing a mechanism by which the host can discover that a connection to a Secondary SVC can be used to convey Service information and by enabling the port on a Secondary SVC through which the connection to the host entity is made to perform information transfer. This enabling could take the form of programming the associated IO controller chipset to receive such Service requests through the said port, or of allowing a Service request to be normally processed rather than be intercepted and aborted, or just providing an indication to the host entity that Service requests can be received through the said port where there was previously no such indication.

In addition to supporting the conveyance of Service information between host entities and a Secondary SVC, it is necessary to implement a mechanism for dispatching Service requests in a way that will avoid conflict with other SVCs that may be concurrently primed to dispatch Service requests that they have received.

According to the feature mentioned above, another embodiment of the service request dispatching mechanism according to the present invention, hereafter referred to as "Host-entity Service Request Serialization", is provided, in which the host entity only issues Service requests to one SVC at a time. Multiple requests could be issued to the one SVC to be queued or concurrently processed on that SVC, however, until all Service requests issued to one SVC have been Serviced to completion, the host entity will not issue Service requests to other SVCs.

Figure 2:
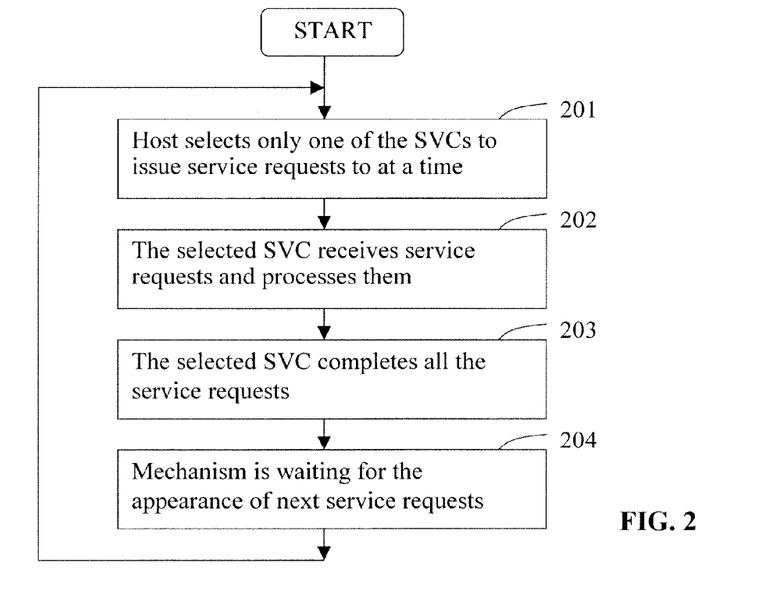
FIG. 2 is a flowchart illustrating an embodiment of the main flow of the Host-entity Service Request Serialization mechanism according to the present invention.

FIG. 2. shows the process flow of this embodiment. In step 201, the host entity selects only one of the SVCs at a time to issue Service requests to. Then, in step 202, the selected SVC receives and processes the service requests. In step 203, The selected SVC completes all the service requests. In step 204, the mechanism is waiting for the appearance of next service requests and the process goes back to step 201. By implementing this functionality, the host entity indirectly implements a mechanism by which conflicts that could arise as a result of concurrent servicing of requests by multiple SVCs are implicitly avoided.

Figure 3A:
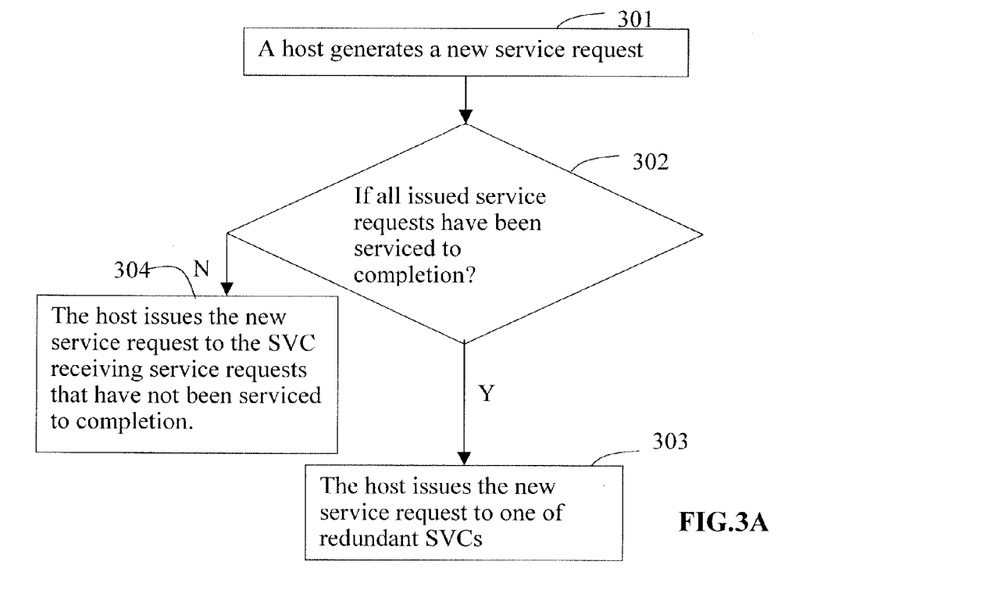
FIG. 3A is a flowchart illustrating an embodiment of the main flow of the service request dispatching mechanism performed by the host according to the present invention.

Please refer to FIG. 3A, in which a flowchart of an embodiment of the main flow of the service request dispatching mechanism performed by the host according to the embodiment of FIG. 2 is illustrated. When the host generates a new service request (step 301), it is tested in step 302 that whether all previously issued service requests have been serviced to completion. If the answer in step 302 is "yes", the host can select anyone of the redundant SVCs to issue the new service request in step 303. If the answer in step 302 is "no", the host can only issue the new service request to the SVC which is servicing the service requests that have not been serviced to completion in step 304.

Figure 3B:
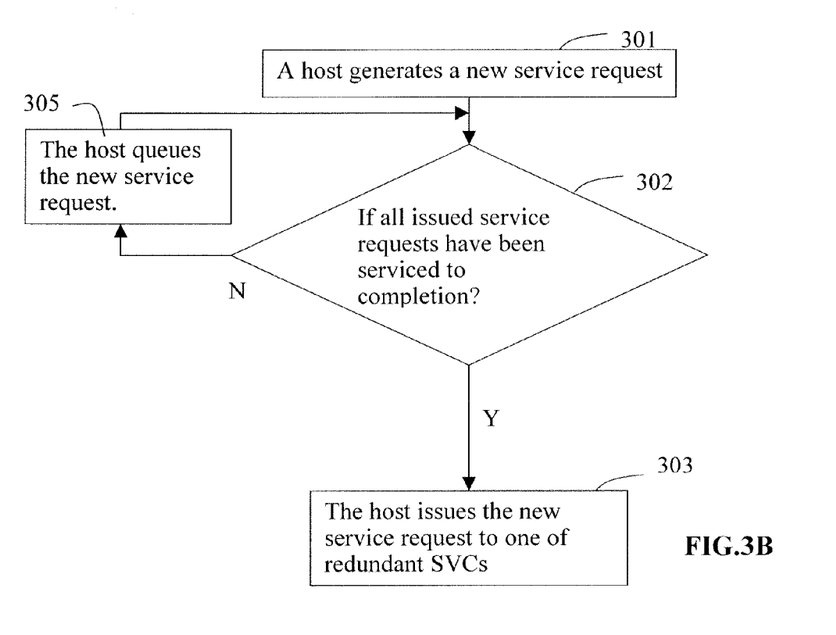
FIG. 3B is a flowchart illustrating another embodiment of the main flow of the service request dispatching mechanism performed by the host according to the present invention.

Please refer to FIG. 3B, in which a flowchart of another embodiment of the main flow of the service request dispatching mechanism performed by the host according to the embodiment of FIG. 2 is illustrated. When the host generates a new service request (step 301), it is tested in step 302 that whether all previously issued service requests have been serviced to completion. If the answer in step 302 is "yes", the host can select anyone of the redundant SVCs to issue the new service request in step 303. If the answer in step 302 is "no", the host will queue and not issue the new service request until the SVC which is servicing the service requests has completed servicing the previous service requests in step 305.

In still another embodiment according to the present invention, hereafter referred to as "Service Request Forwarding", the mechanism could take the form of having Secondary SVCs forward all Service requests that they receive to the Primary SVC for servicing rather than servicing the requests themselves. The Primary SVC can then serialize the servicing of the requests as needed to avoid mutual conflict. On completion of the servicing of a Service request, the associated response data and status would be sent to the SVC that originally received the request, hereafter referred to as the Service Request Forwarder, which would then forward such to the originating host entity.

During this process, any other information associated with the particular Service request would be conveyed between the host entity and the Primary SVC by first conveying the information to the Service Request Forwarder and having the Service Request Forwarder forward the information to the destination. Also, during or on completion of Service request servicing, the Primary SVC would typically convey updated configuration, state and status information to all the other SVCs in the redundant combination. This is necessary to make sure that other SVCs have up-to-date configuration, state and status information locally so as to facilitate consistency in processing between member SVCs of a redundant SVC combination. At any time, should the primary SVC lose the capacity to perform its service request servicing functionality, then another SVC in the redundant set would take over the function of Primary SVC.

Please also refer to FIG. 4, the process flow for this embodiment would typically be as follows. A Secondary SVC receives a Service request from a host entity (step 401). The Secondary SVC becomes the Service Request Forwarder and forwards the Service request to the Primary SVC (step 402). The Primary SVC receives and dispatches the Service request for servicing (step 403). Any information that is to be exchanged as a part of servicing the Service request is conveyed to the Service Request Forwarder by the host entity or by the Primary SVC for forwarding to the other (step 404). On completion of request servicing, the Primary SVC would convey response data and status information to the Service Request Forwarder for forwarding to the host entity (step 405). The Service Request Forwarder forwards the response data and status information to the host entity (step 406).

Figure 4:
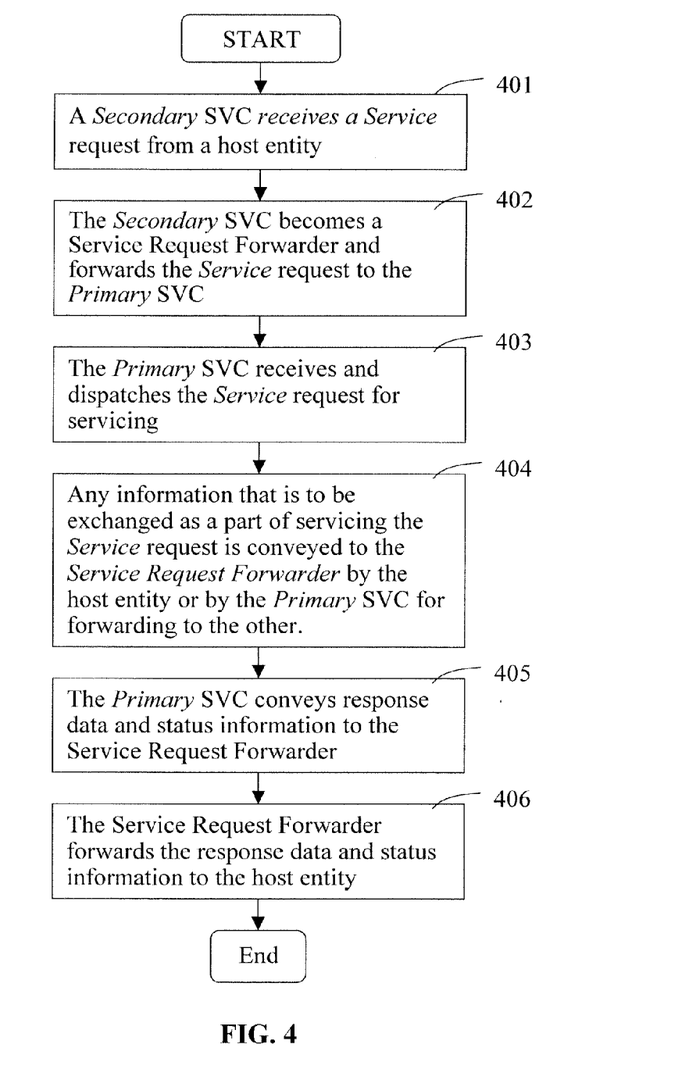
FIG. 4 is a flowchart illustrating an embodiment of the main flow of the Service Request Forwarding mechanism according to the present invention.
Figure 5:
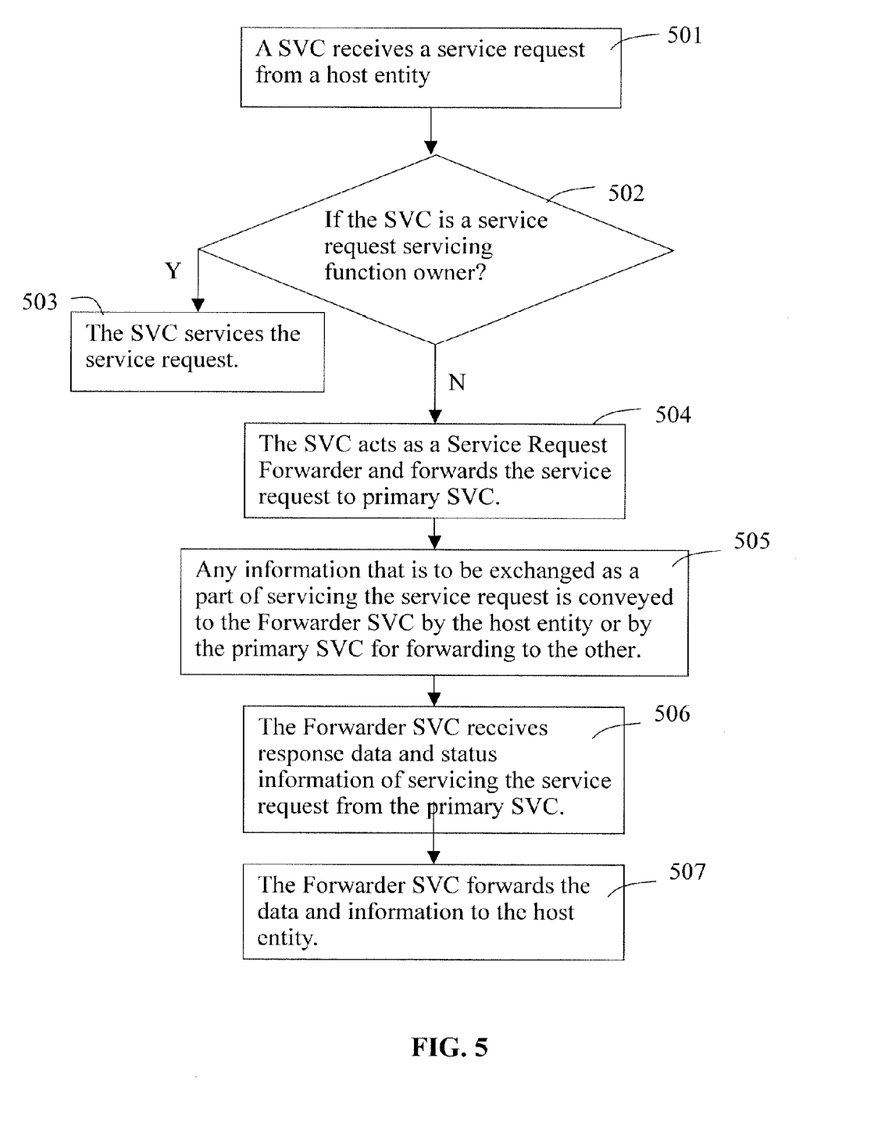
FIG. 5 is a flowchart illustrating an embodiment of the main flow of the service request dispatching mechanism performed by the SVC according to the present invention.

Please refer to FIG. 5, in which a flowchart illustrating an embodiment of the main flow of the service request dispatching mechanism performed by the SVC according to the embodiment of FIG. 4 is illustrated. When a SVC receives a service request from a host entity in step 501. It is tested whether the SVC is a service request servicing function owner in step 502. If the answer is "yes" in 502, the SVC services the service request in step 503. If the answer is "no" in 502, the SVC forwards the service request to primary SVC in step 504 and acts as a Service Request Forwarder. Any information that is to be exchanged as a part of servicing the service request is conveyed to the Forwarder SVC by the host entity or by the primary SVC for forwarding to the other in step 505. The Forwarder SVC receives response data and status information of servicing the service request from the primary SVC in step 506. The Forwarder SVC forwards the data and information to the host entity in step 507.

In still another embodiment of the Service Request dispatching mechanism, hereafter referred to as "Distributed Service Request Servicing", the "ownership" of the Service request servicing function can be transferred between SVCs in a redundant SVC combination. In this implementation, when an SVC receives a Service request from a host entity, it checks if it is the current owner of Service request servicing function. If it is, then it can Service the request directly. If it is not the current owner, then it requests a transfer of ownership to it. In some implementations, a fixed SVC (e.g., the Primary SVC), hereafter referred to as the "Service request servicing function Ownership Arbiter" would serve as the arbiter for determining when and to whom a transfer of this function ownership should occur. In other implementations, this arbitration function would be performed by the SVC that is the current owner of the Service request servicing function. A SVC that has Service requests awaiting servicing would issue a request for ownership to the Ownership Arbiter. The Ownership Arbiter would then inform the SVC that is the current function owner of the existence of Service requests awaiting servicing on other SVCs. The owner would be responsible for relinquishing ownership at a "convenient" time and initiating the transfer of ownership. The transfer could take place through the arbiter (if the arbitration function is performed by the owner), with it functioning as an intermediary, or could be done directly with the requesting SVC.

However, before the requesting SVC actually starts servicing Service requests that it has queued up for execution, it must update its local configuration, state and status information data base to reflect changes that were made while prior Service requests were being Serviced by other SVCs. This would typically entail having the original request servicing function owner that is primed to relinquish ownership convey updated configuration, state and status information to all the other SVCs in the redundant combination before the transfer of ownership is considered complete. At any time, should the Ownership Arbiter lose the capacity to perform its service request servicing functionality, then another SVC in the redundant set would take over the function of Ownership Arbiter.

Figure 6A:
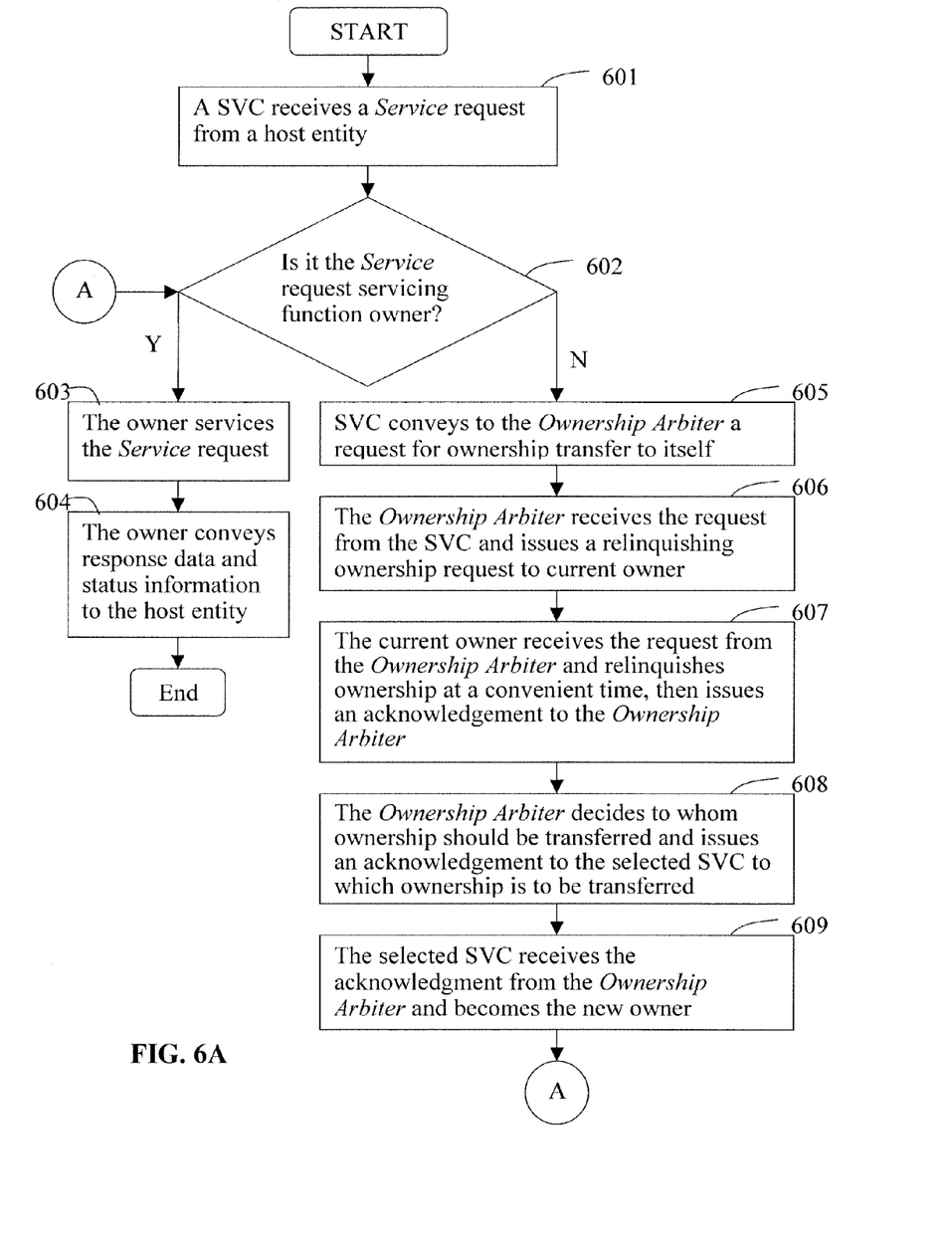
FIG. 6A is a flowchart illustrating an embodiment of the main flow of the Distributed Service Request Servicing mechanism with a fixed Service request servicing function ownership arbiter according to the present invention.

Please refer to FIG. 6A, an example process flow for this embodiment in which there is a fixed Service request servicing function ownership arbiter would be as follows. In step 601, a SVC receives a Service request from the host entity. In step 602, it is tested if the said SVC is the Service request servicing function owner. If the answer is "yes" in step 602, then the owner Services the request directly in step 603 and conveys response data and status information to the host entity in step 604. If the answer is "no" in step 602, the said SVC conveys to the Service request servicing function Ownership Arbiter a request for ownership transfer to itself in step 605. The Ownership Arbiter receives the request from the SVC and then issues a relinquishing ownership request to current owner (step 606). The current owner receives the request from the Ownership Arbiter and then relinquishes ownership at a convenient time, then issues an acknowledgement to the Ownership Arbiter (step 607). The Ownership Arbiter decides to whom ownership should be transferred and issues an acknowledgement to the selected SVC to which ownership is to be transferred (step 608). The selected SVC receives the acknowledgment from the Ownership Arbiter and becomes the new owner (step 609).

In this embodiment, if the answer is "no" in step 602, which means the said SVC is not the Service request servicing function owner, it conveys to the Service request servicing function Ownership Arbiter a request for ownership transfer to itself. The Ownership Arbiter can then decide when ownership should be relinquished by the current. At this time, it may also decide to whom ownership should be transferred in the event that there are multiple concurrent ownership transfer requests from different SVCs. The Ownership Arbiter issues a request to current Service request servicing owner to relinquish ownership. The current Service request servicing function owner receives said request for it to relinquish ownership and prepares for relinquish it. This would typically be done by queuing any new Service requests that may be received during the process and finishing the servicing of any requests currently being Serviced. When this is done, it issues an acknowledgement to the Ownership Arbiter to inform it that ownership has been relinquished. If there are new Service requests that were queued in the process of relinquishing ownership, it also issues an indication of such to the Ownership Arbiter so that ownership of Service request servicing function will be restored to it later on. The ownership arbiter receives the acknowledgement and then, if it has not already done so, decides to whom ownership should be transferred in the event that there are multiple pending Ownership Arbiter requests from different SVCs. The Ownership Arbiter issues an acknowledgement to the SVC to which ownership is to be transferred. That SVC becomes the new Service request servicing function owner and starts to Service pending Service requests. During the process of servicing, any information that is to be exchanged as a part of servicing the Service request is conveyed between the said SVC and the host entity that issued the Service request. On completion of request servicing, the said SVC conveys response data and status information back to the host entity.

Figure 6B:
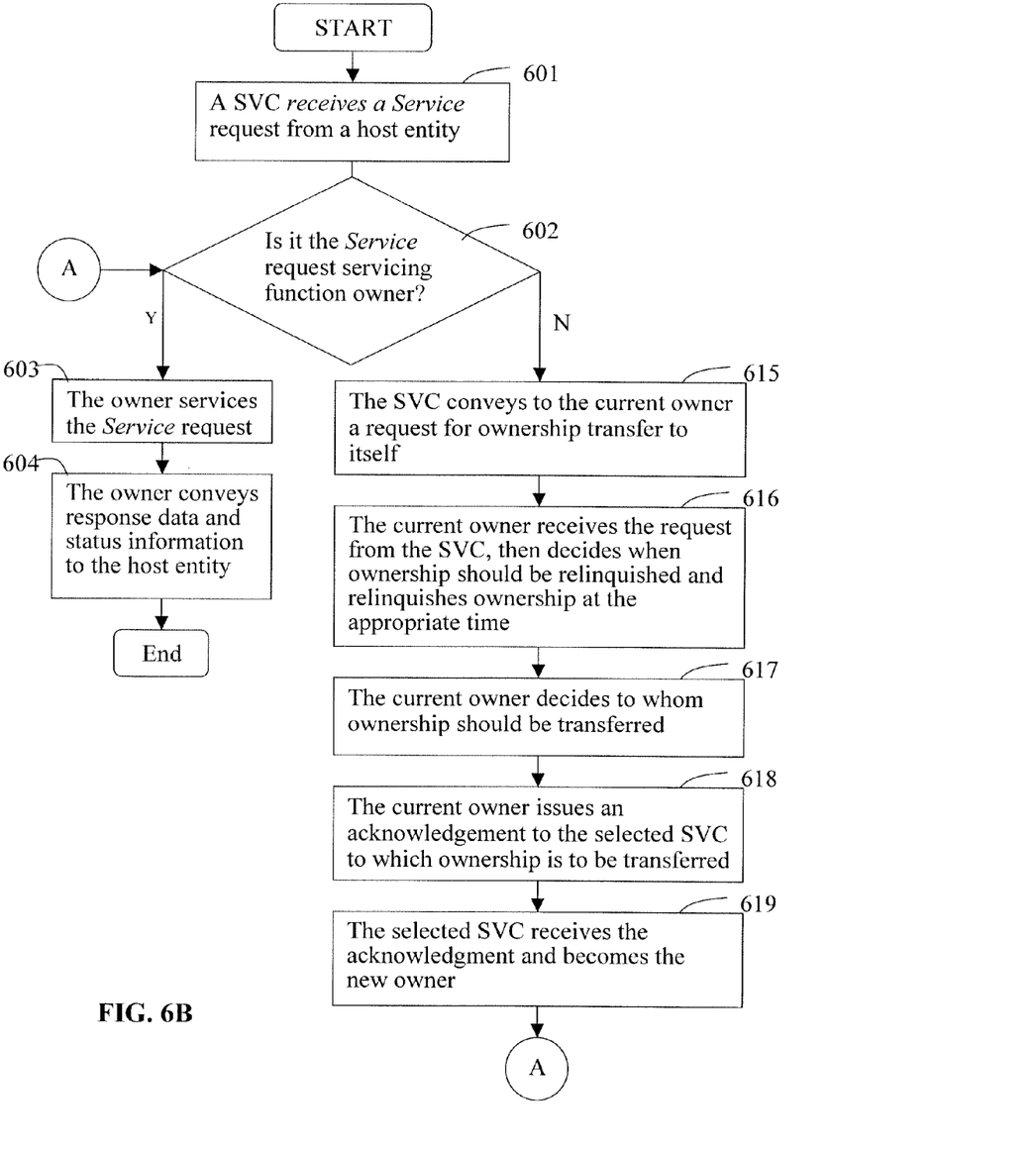
FIG. 6B is a flowchart illustrating an embodiment of the main flow of the Distributed Service Request Servicing mechanism with a floating Service request servicing function ownership arbiter according to the present invention; and, FIG. 7 is a flowchart illustrating an embodiment of the main flow of the service request dispatching mechanism of the present invention according to the present invention.

Please refer to FIG. 6B, an example process flow for this embodiment in which the Service request servicing function ownership arbiter function is performed by the Service request servicing function owner itself would typically be as follows. In step 601, a SVC receives a Service request from the host entity. In step 602, it is tested if the said SVC is the Service request servicing function owner. If the answer is "yes" in step 602, then the owner Services the request directly in step 603 and conveys response data and status information to the host entity in step 604. If the answer is "no" in step 602, the SVC conveys to the current owner a request for ownership transfer to itself in step 615. The current owner receives the request from the SVC, then decides when ownership should be relinquished and relinquishes ownership at the appropriate time (step 616). The current owner decides to whom ownership should be transferred (step 617). The current owner issues an acknowledgement to the selected SVC to which ownership is to be transferred (step 618). The selected SVC receives the acknowledgment and becomes the new owner (step 619).

If the answer is "no" in step 602, which means the said SVC is not the Service request servicing function owner, it conveys to the current Service request servicing function owner a request for ownership transfer to itself. The current owner determines an "appropriate" time to start the process of relinquishing ownership and prepares to relinquish it. This would typically be done by queuing any new Service requests that may be received during the process and finishing the servicing of any requests currently being Serviced. When the current owner is ready to relinquish ownership, it decides to whom ownership should be transferred in the event that there are multiple pending ownership transfer requests from different SVCs. It then issues an acknowledgement to the SVC to which ownership is to be transferred. That SVC becomes the new Service request servicing owner and starts to Service pending Service requests. If there are new Service requests that were queued in the process of relinquishing ownership, it also issues an indication of such to the new Service request servicing function owner so that ownership of Service request servicing function will be restored to it later on. During the process of servicing, any information that is to be exchanged as a part of servicing the Service request is conveyed between the said SVC and the host entity that issued the Service request. On completion of request servicing, the said SVC conveys response data and status information back to the host entity.

In the above embodiments having a Service request servicing function ownership arbiter, whether there is a fixed ownership arbiter or the ownership arbiter is the Service request servicing function owner itself, once the new Service request servicing function owner is decided, other SVCs should be notified who is the new Service request servicing function owner. In addition, if there is more than one Service request servicing function ownership transfer requester, either the ownership transfer requests should be conveyed to the new owner, or other ownership transfer requesters should be notified that the ownership transfer request has been rejected.

Figure 7:
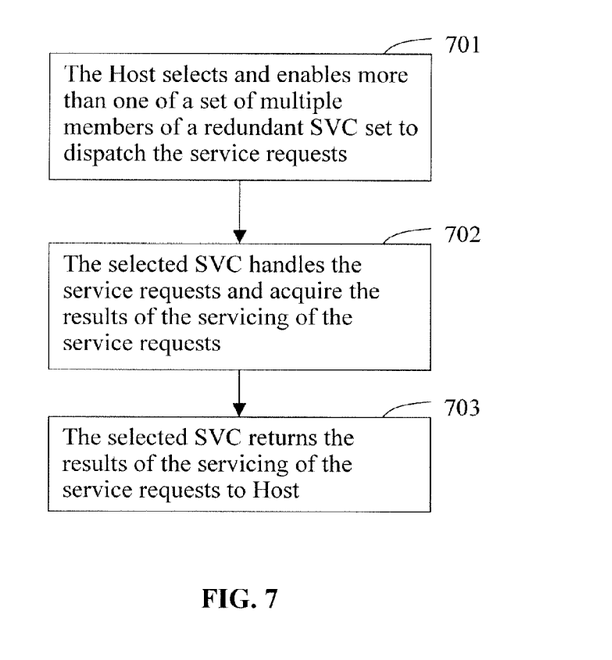

Form the description above with reference to FIG. 7, in which an embodiment of the main flow of the service request dispatching mechanism according to the present invention is shown, it is noted that, according to the current invention, the Host selects and enables more than one of a set of multiple members of a redundant SVC set to dispatch the service requests (step 701), and then the selected SVC handles the service requests and acquire the results of the servicing of the service requests (step 702). Finally, the selected SVC returns the results of the servicing of the service requests to Host (step 703).

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for dispatching of service requests in a redundant storage virtualization subsystem (SVS) including a plurality of storage virtualization controllers (SVCs) and a plurality of physical storage devices (PSDs), comprising the steps of:
    configuring redundantly a first SVC and a second SVC of the plurality of SVCs such that when one of said first and second SVCs fails, the other of said first and second SVCs will take over functionality of the failed SVC to handle I/O requests;
    configuring said first SVC and said second SVC such that not only said first SVC but also said second SVC handle the service requests, and that when the one SVC fails, said the other SVC will take over functionality of the failed SVC to handle said service requests;
    mapping, by the plurality of SVCs, combinations of sections of physical storage media of the PSDs into a logical media unit visible to a host entity;
    issuing, by said host entity which is external to the plurality of SVCs, a first service request to said first SVC, when said first SVC and said second SVC, which are different SVCs, are both alive;
    handling, by said first SVC, said first service request, acquiring a first result of servicing the first service request, and returning said first result to the host entity, when said first SVC and said second SVC are both alive;
    issuing, by said host entity, a second service request to said second SVC, when said first SVC and said second SVC are both alive; and
    handling, by said second SVC, said second service request, acquiring a second result of servicing the second service request, and returning said second result to the host entity, when said first SVC and said second SVC are both alive;
    wherein the service request is selected from one of a group comprising a configuration request, a management request and a monitoring request, and the monitoring request is issued for monitoring not including for IO error monitoring.

2. The method defined in claim 1, wherein said second service request is issued after said first result is returned to the host entity.

3. The method defined in claim 1, wherein said second service request is issued before said first result is returned to the host entity.

4. A method for dispatching of service requests in a redundant storage virtualization subsystem (SVS) including a plurality of storage virtualization controllers (SVCs) and a plurality of physical storage devices (PSDs), comprising the steps of:
    configuring redundantly the plurality of SVCs such that when one of the plurality of SVCs fails, another of the plurality of SVCs will take over functionality of the failed SVC to handle I/O requests;
    configuring the plurality of SVCs such that the plurality of SVCs handle said service requests, and that when the one SVC fails, said another SVC will take over functionality of the failed SVC to handle said service requests;
    mapping, by the plurality of SVCs, combinations of sections of physical storage media of the PSDs into a logical media unit visible to a host entity;
    selecting at least one of the SVCs by said host entity which is external to the plurality of SVCs, when said plurality of SVCs are alive;

enabling a port on the at least one selected SVC for dispatching of service requests, when said plurality of SVCs are alive;

issuing at least one service request to said at least one selected SVC, when said plurality of SVCs, which are different SVCs, are alive;

handling said at least one service request by said at least one selected SVC, when said plurality of SVCs are alive;

acquiring a result of servicing the at least one service request by said at least one selected SVC, when said plurality of SVCs are alive; and, returning to the host entity the result by said at least one selected SVC, when said plurality of SVCs are alive;

wherein the service request is selected from one of a group comprising a configuration request, a management request and a monitoring request, and the monitoring request is issued for monitoring not including for IO error monitoring.

5. The method defined in claim 4, wherein said host entity selects only one of said SVCs to issue said service requests at a time, and said host entity will not issue said service requests to other SVCs until all service requests issued to said one SVC have been serviced to completion.

6. The method defined in claim 5, wherein said selected SVC handles said at least one service request by servicing the service requests.

7. The method defined in claim 4, wherein
said selected SVC handles said at least one service request by forwarding said service requests to an owner of said service request servicing function; and,
said selected SVC acquires a result of servicing the at least one service request by receiving a service response from said owner.

8. The method defined in claim 4, wherein said step of
said selected SVC handling said at least one service request comprises:
said selected SVC checking if it is an owner of said service request servicing function; and,
if it is not, then said selected SVC conveying a request for ownership transfer to itself, and said selected SVC servicing the service requests after said selected SVC becomes an owner of said service request servicing function.

9. A method for dispatching of service requests in a redundant storage virtualization subsystem (SVS) including a plurality of storage virtualization controllers (SVCs) and a plurality of physical storage devices (PSDs), comprising the steps of:
configuring redundantly a first SVC and a second SVC of the plurality of SVCs such that when one of said first and second SVCs fails, the other of said first and second SVCs will take over functionality of the failed SVC to handle I/O requests;
configuring said first SVC and said second SVC such that not only said first SVC but also said second SVC may handle said service requests, and that when the one SVC fails, said the other SVC will take over functionality of the failed SVC to handle said service requests;
mapping, by the plurality of SVCs, combinations of sections of physical storage media of the PSDs into a logical media unit visible to a host entity;
selecting, by said host entity which is external to the plurality of SVCs, said first SVC to issue said service requests, when said first SVC and said second SVC, which are different SVCs, are both alive;
receiving, by said first SVC, said service requests, when said first SVC and said second SVC are both alive;

completing, by said first SVC, the servicing of all the received service requests, when said first SVC and said second SVC are both alive; and, selecting, by said host entity, said second SVC to issue said service requests, when said first SVC and said second SVC are both alive;

wherein the service request is selected from one of a group comprising a configuration request, a management request and a monitoring request, and the monitoring request is issued for monitoring not including for IO error monitoring.

10. A method for dispatching of service requests in a redundant storage virtualization subsystem (SVS) including a plurality of storage virtualization controllers (SVCs) and a plurality of physical storage devices (PSDs), comprising the steps of:
configuring redundantly a first SVC and a second SVC of the plurality of SVCs such that when one of said first and second SVCs fails, the other of said first and second SVCs will take over functionality of the failed SVC to handle I/O requests;
configuring said first SVC and said second SVC such that not only said first SVC but also said second SVC may handle the service requests, and that when the one SVC fails, said the other SVC will take over functionality of the failed SVC to handle the service requests;
mapping, by the plurality of SVCs, combinations of sections of physical storage media of the PSDs into a logical media unit visible to a host entity;
receiving, by said first SVC, a service request from said host entity which is external to the plurality of SVCs, and forwarding said received service request to said second SVC, when said first SVC and said second SVC, which are different SVCs, are both alive;
dispatching, by said second SVC, the service request for servicing, when said first SVC and said second SVC are both alive;
on completion of request servicing, said second SVC conveying response data and status information to said first SVC, when said first SVC and said second SVC are both alive; and,
forwarding, by said first SVC, said response data and status information to the host entity, when said first SVC and said second SVC are both alive;
wherein the service request is selected from one of a group comprising a configuration request, a management request and a monitoring request, and the monitoring request is issued for monitoring not including for IO error monitoring.

11. The method defined in claim 10, wherein when said second SVC is in charge of the dispatching of the service requests, any information associated with said service request conveyed between said host entity and said second SVC will be first conveyed to said first SVC and then forwarded by said first SVC to a destination device.

12. A method for dispatching of service requests in a redundant storage virtualization computer system including a plurality of storage virtualization controllers (SVCs) and a plurality of physical storage devices (PSDs), comprising the steps of:
configuring redundantly a plurality of SVCs such that when one of the plurality of SVCs fails, another of the plurality of SVCs will take over functionality of the failed SVC to handle I/O requests;
configuring the plurality of SVCs such that the plurality of SVCs handle said service requests, and that when the one SVC fails, said another SVC will take over functionality of the failed SVC to handle the service requests;

mapping, by the plurality of SVCs, combinations of sections of physical storage media of the PSDs into a logical media unit visible to a host entity;

selecting, by said host entity which is external to the plurality of SVCs, only one of the plurality of SVCs at a time to issue said service requests, when said plurality of SVCs, which are different SVCs, are alive; and receiving, by said selected SVC, said service requests from said host entity and servicing them, then returning the results of the servicing of the service requests to said host entity, when said plurality of SVCs are alive;

wherein the service request is selected from one of a group comprising a configuration request, a management request and a monitoring request, and the monitoring request is issued for monitoring not including for IO error monitoring.

13. The method defined in claim 12, wherein said host entity checks if all service requests issued to one of said SVCs have been serviced to completion before said selecting one of said SVCs to issue said service requests.

14. The method defined in claim 12, wherein if said issued service requests have not been serviced to completion, said host entity selects one of said SVCs to issue said service requests after said issued service requests have been serviced to completion.

15. The method defined in claim 12, wherein if said issued service requests have not been serviced to completion, said host entity selects said one SVC to issue said service request.

16. A method for dispatching of service requests, said method being performed by a host in a redundant storage virtualization computer system including a plurality of storage virtualization controllers (SVCs) and a plurality of physical storage devices (PSDs), comprising the steps of:

configuring redundantly a plurality of SVCs such that when one of the plurality of SVCs fails, another of the plurality of SVCs will take over functionality of the failed SVC to handle I/O requests;

configuring the plurality of SVCs such that the plurality of SVCs handle said service requests, and that when the one SVC fails, said another SVC will take over functionality of the failed SVC to handle said service requests;

mapping, by the plurality of SVCs, combinations of sections of physical storage media of the PSDs into a logical media unit visible to the host entity;

generating a service request by the host entity which is external to the plurality of redundant SVCs, when the plurality of SVCs, which are different SVCs, are alive;

checking if all issued service requests have been serviced to completion, when the plurality of SVCs are alive;

issuing said service request to one of the redundant SVCs, if all issued service requests have been serviced to completion, when the plurality of SVCs are alive;

otherwise, issuing, by said host entity, said service request to one of said SVCs after said issued service requests have been serviced to completion, when the plurality of SVCs are alive;

wherein the service request is selected from one of a group comprising a configuration request, a management request and a monitoring request, and the monitoring request is issued for monitoring not including for IO error monitoring.

17. The method defined in claim 16, wherein said host entity randomly selects any one of said SVCs as a receiving object.

18. A method for dispatching of service requests, said method being performed by a host in a redundant storage virtualization computer system having a plurality of storage virtualization controllers (SVCs) and a plurality of physical storage devices (PSDs), said SVCs being redundantly configured such that when one of the plurality of SVCs fails, another of the plurality of SVCs will take over functionality of the failed SVC to handle I/O requests, comprising the steps of:

configuring the plurality of SVCs such that the plurality of SVCs handle service requests, and that when the one SVC fails, said another SVC will take over functionality of the failed SVC to handle the service requests;

mapping, by the plurality of SVCs, combinations of sections of physical storage media of the PSDs into a logical media unit visible to the host entity;

generating a new service request by the host which is external to the plurality of SVCs, when the plurality of SVCs, which are different SVCs, are alive;

checking if all previously issued service requests have been serviced to completion, when the plurality of SVCs are alive;

issuing said new service request to one of the SVCs, if all the previously issued service requests have been serviced to completion, when the plurality of SVCs are alive;

otherwise, issuing, by said host entity, said new service request to the SVC which received said service requests issued previously and not serviced to completion, when the plurality of SVCs are alive;

wherein the service request is selected from one of a group comprising a configuration request, a management request and a monitoring request, and the monitoring request is issued for monitoring not including for IO error monitoring.

19. The method defined in claim 18, wherein said step of issuing said service request if all issued service requests have been serviced to completion further comprises the step of said host entity randomly selecting any one of said SVCs as a receiving object of the new service request.

20. A method for dispatching of service requests in a redundant storage virtualization computer system having a plurality of storage virtualization controllers (SVCs) and a plurality of physical storage devices (PSDs), said SVCs being redundantly configured such that when one of the plurality of SVCs fails, another of the plurality of SVCs will take over functionality of the failed SVC to handle I/O requests, comprising the steps of:

configuring the plurality of SVCs such that the plurality of SVCs handle the service requests, and that when the one SVC fails, said another SVC will take over functionality of the failed SVC to handle the service requests;

mapping, by the plurality of SVCs, combinations of sections of physical storage media of the PSDs into a logical media unit visible to a host entity;

selecting, by said host entity which is external to the plurality of SVCs, one of the SVCs to issue the service requests, when the plurality of SVCs, which are different SVCs, are alive;

receiving the service requests from said host entity by said selected SVC and checking if said selected SVC itself is an owner of the service request servicing function, when the plurality of SVCs are alive; and, if it is, then said selected SVC servicing the service request, when the plurality of SVCs are alive; and, if it is not, said selected SVC forwarding the service requests to an owner of the service request servicing function, when the plurality of SVCs are alive, then said owner receiving and dispatching the service requests for servicing and returning the results of the servicing of the service requests to said host entity, when the plurality of SVCs are alive;

wherein the service request is selected from one of a group comprising a configuration request, a management request and a monitoring request, and the monitoring request is issued for monitoring not including for IO error monitoring.

21. The method defined in claim 20, wherein said owner returns the results of the servicing of the service requests to said host entity through said selected SVC.

22. The method defined in claim 20, further comprising the step of: any information associated with said service request will be conveyed between said host entity and said owner by first conveying the information to said selected SVC and having said selected SVC forward the information to a destination during said owner servicing the service requests.

23. A method for dispatching of service requests, said method being performed by a first SVC in a redundant storage virtualization computer system having a plurality of storage virtualization controllers (SVCs) and a plurality of physical storage devices (PSDs), said SVCs being redundantly configured such that when one of the plurality of SVCs fails, another of the plurality of SVCs will take over functionality of the failed SVC to handle I/O requests, comprising the steps of:

configuring the plurality of SVCs such that the plurality of SVCs handle the service requests, and that when the one SVC fails, said another SVC will take over functionality of the failed SVC to handle the service requests;

mapping, by the plurality of SVCs, combinations of sections of physical storage media of the PSDs into a logical media unit visible to a host entity;

receiving a service request from said host entity which is external to the plurality of SVCs, when the plurality of SVCs, which are different SVCs, are alive;

forwarding said service request to a second SVC of the plurality of SVCs, when the plurality of SVCs are alive;

receiving response data and status information of servicing said service request from the second SVC, when the plurality of SVCs are alive; and, forwarding said data and information to said host entity, when the plurality of SVCs are alive;

wherein the service request is selected from one of a group comprising a configuration request, a management request and a monitoring request, and the monitoring request is issued for monitoring not including for IO error monitoring.

24. The method defined in claim 23, wherein before performing the step of forwarding said service request to a second SVC, said first SVC checks if it is an owner of said service request servicing function, if it is, then said first SVC services said service request without performing the steps of forwarding said service request to the second SVC and receiving response data and status information of servicing said service request from the second SVC.

25. The method defined in claim 24, further comprising the step of, during servicing said service requests, said first SVC conveying information associated with said service request to said host entity and receiving information associated with said service request from said host entity.

26. The method defined in claim 23, further comprising the steps of receiving information associated with said service request from the second SVC and forwarding said information to said host entity, after the step of forwarding said service request to the second SVC.

27. The method defined in claim 23, further comprising the steps of receiving information associated with said service request from said host entity and forwarding said information to the second SVC, after the step of forwarding said service request to the second SVC.

28. A method for dispatching of service requests, said method being performed by a first SVC in a redundant storage virtualization computer system having a plurality of storage virtualization controllers (SVCs) and a plurality of physical storage devices (PSDs), said SVCs being redundantly configured such that when one of the plurality of SVCs fails, another of the plurality of SVCs will take over functionality of the failed SVC to handle I/O requests, comprising the steps of:

configuring the plurality of SVCs such that the plurality of SVCs handle the service requests, and that when the one SVC fails, said another SVC will take over functionality of the failed SVC to handle the service requests;

mapping, by the plurality of SVCs, combinations of sections of physical storage media of the PSDs into a logical media unit visible to a host entity;

receiving a service request from a second SVC of the plurality of SVCs when the plurality of SVCs, which are different SVCs, are alive;

servicing said service request, when the plurality of SVCs are alive; and, issuing response data and status information of servicing said service request to the second SVC, when the plurality of SVCs are alive;

wherein the service request is selected from one of a group comprising a configuration request, a management request and a monitoring request, and the monitoring request is issued for monitoring not including for IO error monitoring; and wherein the service request is issued by said host entity which is external to the plurality of SVCs.

29. The method defined in claim 28, wherein the step of servicing said service request further comprises the steps of: conveying information associated with said service request to the second SVC; and, receiving information associated with said service request from the second SVC.

30. The method defined in claim 28, further comprising the steps of:

receiving a service request from the host entity;

servicing said service request from said host entity; and, issuing response data and status information of servicing said service request to said host entity.

31. The method defined in claim 30, wherein the step of servicing said service request from said host entity further comprises:

conveying information associated with said service request to said host entity; and, receiving information associated with said service request from said host entity.

* * * * *